United States Patent [19]

Pawelczyk et al.

[11] Patent Number: 5,158,730
[45] Date of Patent: Oct. 27, 1992

[54] DEVICE FOR THE GRANULATION OF A PLASTIC MOLDING COMPOUND WHICH DOES NOT FLOW UNDER GRAVITY AND THE USE OF AN EXTRUDER

[75] Inventors: Hubert Pawelczyk, Duesseldorf; Franz-Josef Carduck, Haan, both of Fed. Rep. of Germany

[73] Assignee: Henkel Kommanditgesellschaft auf Aktien, Duesseldorf-Holthausen, Fed. Rep. of Germany

[21] Appl. No.: 663,824

[22] PCT Filed: Sep. 12, 1989

[86] PCT No.: PCT/EP89/01062
§ 371 Date: May 20, 1991
§ 102(e) Date: May 20, 1991

[87] PCT Pub. No.: WO90/03217
PCT Pub. Date: Apr. 5, 1990

[30] Foreign Application Priority Data

Sep. 21, 1988 [DE] Fed. Rep. of Germany ....... 3832006

[51] Int. Cl.$^5$ .................................................. B29B 9/06
[52] U.S. Cl. ..................................... 264/141; 264/142; 425/198; 425/308; 425/311; 425/382.4; 425/464; 425/DIG. 230
[58] Field of Search .................... 264/141, 142, 176.1, 264/143, 169; 425/198, 308, 310, 311, 313, 382 R, 382.4, 463, 464, DIG. 230

[56] References Cited

U.S. PATENT DOCUMENTS 3,949,039 4/1976 Yamamoto et al. ................ 264/142
4,290,989 9/1981 Topor et al. ......................... 264/142

Primary Examiner—Jay H. Woo
Assistant Examiner—James P. Mackey
Attorney, Agent, or Firm—Ernest G. Szoke; Wayne C. Jaeschke; Real J. Grandmaison

[57] ABSTRACT

This invention relates to an extruder having a granulating head for the granulation of a plastic molding compound which does not flow under gravity, more particularly an enzyme concentrate suitable for detergents, to granules having a particle size of at most 1 mm and, more particularly, at most 0.8 mm. To obtain uniform distribution of the molding compound to be processed over the entire cross-section of the molding plate, the granulating head has an externally arranged die plate support carrying perforated disks, a displacement cone arranged behind the die plate support and a preliminary distributor in the form of a perforated plate arranged between the die plate support and the displacement cone. In addition, the die plate support has bore-like passages each with a perforated disk which is arranged at the front end thereof and of which the bores have a rear zone of relatively large cross-section and a front zone of relatively small cross-section, the transitional zone between the rear zone and the front zone being inclined at an angle of 55° to 65° C. relative to the horizontal.

20 Claims, 2 Drawing Sheets

DEVICE FOR THE GRANULATION OF A PLASTIC MOLDING COMPOUND WHICH DOES NOT FLOW UNDER GRAVITY AND THE USE OF AN EXTRUDER

BACKGROUND OF THE INVENTION

1. Field of the Invention

This invention relates to a device for the granulation of a plastic molding compound which does not flow under gravity, more particularly an enzyme concentrate suitable for detergents, comprising a granulating head which adjoins an extruder and which comprises a number of bore-like passages on its outlet side and a preliminary distributor in the form of a perforated plate arranged at a distance from the extruder screw and the bore-like passages on the extruder side.

Modern detergents contain enzyme granules, for example proteases, amylases, lipases. In the production of enzyme granules, it is important to obtain a dust-free product of homogeneous composition and uniform external appearance, including shape, color and general appearance. Since granules of the type in question must not disintegrate in the detergent powder, their particle sizes have to be comparable with the other granules. Accordingly, die plates having bore diameters of less than 0.8 mm have to be used where an extruder is employed for granulation.

Enzyme granules consist not only of the liquid enzyme concentrates, but also of fillers, zeolites, tripolyphosphates, starch, cellulose, methyl cellulose, carboxymethyl cellulose, waxes, water-soluble polymers, etc.

Another problem is the uniform distribution of the compound to be processed over the entire cross-section of the molding plates containing die plates. This problem is particularly serious when the cross-section of the molding plate, for example with 3,000 to 6,000 individual bores, is considerably larger than the cross-section of the outlet opening for the molding compound at the end of the extruder screw. Unless the molding compound to be processed is uniformly distributed over the entire cross-section of the moulding plate, the compound issues from the individual openings at different rates. Accordingly, the issuing strands are cut into granules of different length by the blade rotating in front of the moulding plate so that a uniform product cannot be obtained.

2. Discussion of Related Art

Although a device of the type mentioned at the beginning is known from DE-OS 25 57 166, only a few (about twenty at most) bore-like passages are provided in the known granulating head so that the above-mentioned problem of uniform distribution of the molding compound does not arise. In the known extruder, the molding compound is uniformly distributed for the simple reason that all the bores are arranged symetrically to one another and equidistantly from the central axis of the extruder.

Accordingly, the problem addressed by the present invention was to provide a granulating device of the type mentioned at the beginning which would enable the molding compound for processing to be uniformly distributed over the entire cross-section of the moulding plate even when the cross-section of the moulding plate was considerably larger than the cross-section of the outlet opening for the molding compound at the end of the extruder screw.

DESCRIPTION OF THE INVENTION

Other than in the operating examples, or where otherwise indicated, all numbers expressing quantities of ingredients or reaction conditions used herein are to be understood as modified in all instances by the term "about".

According to the invention, the solution to this problem is characterized in that, in a device of the type mentioned at the beginning, the preliminary distributor is preceded on the extruder side by a displacement cone and in that the bore-like passages are formed in a support plate and, at the front end of the support plate, each comprise a perforated disk of which the bores have an inlet-end zone of relatively large cross-section and an outlet-end zone of relatively small diameter, the transitional zone between these two zones being inclined at an angle of 55° to 65° relative to the longitudinal axis of the bores.

According to the invention, the ratio of length to diameter in the granules is the same over the entire cross-section section of the molding plate which is also referred to herein as the support plate.

In one particularly advantageous embodiment of the invention, the bore-like passages have substantially the same diameter as the perforated disks. Both here and in the following, the expressions "substantially the same" and "substantially equal" mean that the deviations are at most 10%.

In addition, uniform distribution of the molding compound is promoted in particular by a baffle plate which is arranged behind the displacement cone on the extruder side and of which the axial bore increases substantially from the diameter of the extruder screw to substantially the diameter of the preliminary distributor. This baffle plate provides the molding compound with a regular path via the displacement cone to the cross-sectional area of the preliminary distributor.

To avoid disturbances in the flow of the molding compound in the region of the displacement zone, the inner surfaces of the baffle plate all have rounded edges.

To ensure uniform flow of the moulding compound from the extruder screw between the baffle plate and the displacement cone, the distance between that surface of the displacement cone which faces the extruder and the opposite inner surface of the baffle plate is substantially constant. A more uniform flow also provides for more uniform distribution of the molding compound over the cross-section of the preliminary distributor facing the extruder.

To guarantee minimal differences between the pressures under which the molding compound is introduced into the bores of the preliminary distributor, the displacement cone is designed in such a way that the lengths of the paths of the molding compound to be granulated to the bores of the preliminary distributor which are situated nearest the longitudinal axis of the granulating head and to those situated furthest away are substantially the same.

In addition, it is favorable to a uniform feed pressure of the molding compound into the bores of the preliminary distributor if the distance between the outer cross-sectional area of the preliminary distributor on the extruder side and the opposite surface of the displacement cone is at least 3% of the diameter of the preliminary distributor.

The shape of the capillaries in the perforated disk is important to the production of uniform granules. To this end, it is proposed that the diameter of the outlet-end zone of the bores in the perforated disk should be between 0.5 and 1.0 mm. In another advantageous embodiment, the length of the bores in the perforated disk is between 1.5 and 2 times the diameter of the outlet-end zone. In another advantageous embodiment, the diameter of the inlet-end zone of the bores in the perforated disk is between 1.7 and 3 times the diameter of the outlet-end zone.

The invention also relates to the use of an extruder of the above-mentioned type for granulating enzyme concentrates for detergents. An extruder of the type in question is particularly suitable for such an application. In this case, it is further proposed that the enzyme concentrate should be forced through the granulating head under pressures of 80 to 200 bar and preferably under pressures of 110 to 150 bar.

BRIEF DESCRIPTION OF THE DRAWINGS

One example of embodiment of the invention is described in detail in the following with reference to the accompanying drawings, wherein.

DETAILED DESCRIPTION OF THE DRAWINGS

Figure 1:
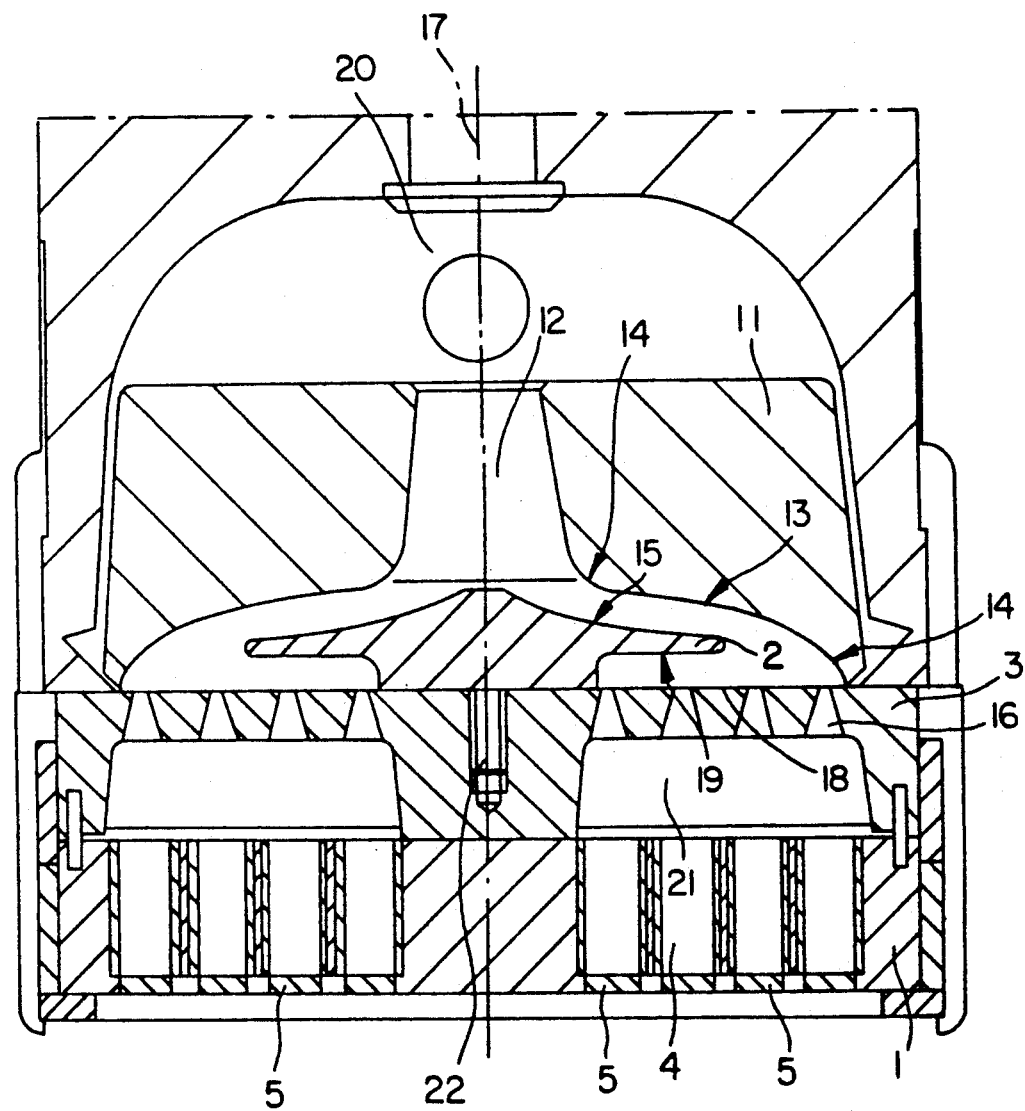
FIG. 1 is a longitudinal section through a granulating head of a device according to the invention.

FIG. 1 is a cross-section through a granulating head according to the invention. The longitudinal axis of the granulating head is shown at (17). The molding compound enters the granulating head at (20), passes through the baffle plate (11), flows along that plate and the displacement cone (2) onto the rear cross-section (18) of the preliminary distributor (3). The molding compound is forced through the orifices of the preliminary distributor (3), the bores (16), into an empty space (21) between the preliminary distributor (3) and the support plate (1). This support plate (1) is referred to elsewhere as the molding plate. At its outlet-end front, it comprises a number of perforated disks (5) of which the bores (6) have the longitudinal section shown in FIG. 2. Arranged behind the support plate (1) is a rotating blade (not shown) which cuts the thin strands issuing into granules.

The support plate (1) comprises a plurality of bore-like passages (4) which are arranged in concentric circles around the longitudinal axis of the granulating head and at the outlet-end orifices of which the perforated disks (5) are arranged. The illustrated support plate contains 75 such bore-like passages (4), each of which is closed at its front end by perforated disks (5) each comprising 87 capillary-like bores (6).

Figure 2:
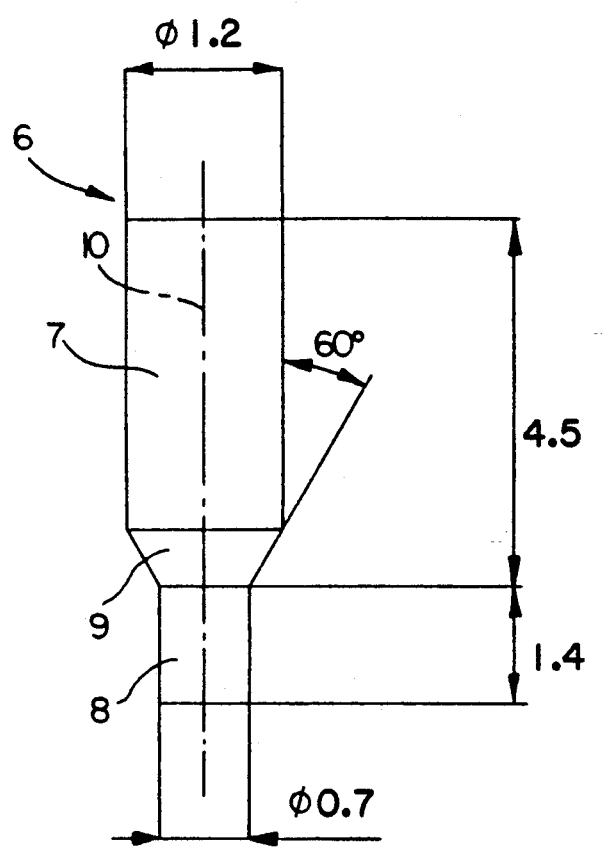
FIG. 2 is a longitudinal section through a bore in the perforated disk according to the invention.

The bores (6) shown in FIG. 2 have a narrow front outlet-end zone (8) and an inlet-end zone (7). The length data in FIG. 2 are in mm. The outlet-end zone (8) has a diameter of 0.7 mm while the inlet-end zone (7) has a diameter of 1.2 mm. The length of the outlet-end zone (8) is 1.4 mm while the length of the inlet-end zone (7) is 4.5 mm. In the transitional zone (9), the inclination of the wall relative to the longitudinal axis (10) is 60°.

When the molding compound coming from the extruder flows through the axial bore (12), it impinges on the displacement cone (2) and flows between that surface (15) of the displacement cone (2) which faces the extruder and the opposite inner surface (13) of the baffle plate (11) onto the cross-section (18) of the preliminary distributor (3) facing the extruder. This passage should neither narrow nor widen. To ensure uninterrupted flow, the inner surfaces (13) of the baffle plate (11) all have rounded edges (14).

At the outer cross-sectional area (18) of the preliminary distributor (3) facing the extruder, the molding compound then passes through the orifices (16) into the space (21) between the preliminary distributor (3) and the support plate (1). That surface of the displacement cone (2) which faces the outer cross-sectional area (18) of the preliminary distributor (3) is shown at (19).

The diameter of the plate as a whole is 30 cm. The displacement cone (2) is fixedly connected to the preliminary distributor (3) at (22) by a screwthread.

We claim:

1. A granulating device adjoining an outlet of the extruder comprising a baffle plate leading into a displacement cone located upstream of a perforated plate preliminary distributor which is spaced from plural bore-like passages in a support plate, each bore-like passage including a perforated disk, wherein molding compound path lengths leading into bores of said preliminary distributor located nearest the longitudinal axis of said device are substantially equal to path lengths leading into bores of said preliminary distributor located furthest from the longitudinal axis of said device.

2. The device of claim 1 wherein said bore-like passage has substantially the same diameter as said perforated disk.

3. The device as in claim 1 wherein said baffle plate has an outlet bore diameter which is substantially the same as the diameter of said preliminary distributor.

4. The device as in claim 1 wherein said perforated disk has a bore whose inlet-end zone has a diameter which is larger than the diameter of an outlet-end zone of said bore of said perforated disk.

5. The device as in claim 4 wherein said bore of said perforated disk has a transition zone located between said inlet-end zone and said outlet-end zone, and said transition zone has an angle of inclination of from about 55° to about 65° relative to the longitudinal axis of said bore of said perforated disk.

6. The device as in claim 4 wherein said outlet-end zone of said bore of said perforated disk has a diameter of between about 0.5 and about 1.0 mm.

7. The device as in claim 4 wherein the length of said outlet-end zone is between about 1.5 and about 2 times the diameter of said outlet-end zone.

8. The device as in claim 4 wherein the diameter of said inlet-end zone is between about 1.7 and about 3 times the diameter of said outlet-end zone.

9. The device as in claim 1 wherein said baffle plate has an inner surface facing said displacement cone, and said inner surface has a rounded configuration.

10. The device as in claim 9 wherein the distance from said inner surface of said baffle plate facing said displacement cone to said displacement cone is substantially constant.

11. A process of granulating a plastic molding compound which does not flow under gravity, comprising forcing the molding compound under a pressure of from about 80 to about 200 bar through a granulating head having a baffle plate leading into a displacement cone located upstream of a perforated plate preliminary distributor which is spaced from plural bore-like passages in a support plate, each bore-like passage including a perforated disk, wherein molding compound path lengths leading into bores of said preliminary distributor located nearest the longitudinal axis of said granulating head are substantially equal to path lengths leading into bores of said preliminary distributor located furthest from the longitudinal axis of said granulating head.

12. The process as in claim 11 wherein said bore-like passage has substantially the same diameter as said perforated disk.

13. The process as in claim 11 wherein said baffle plate has an outlet bore diameter which is substantially the same as the diameter of said preliminary distributor.

14. The process as in claim 11 wherein said perforated disk has a bore whose inlet-end zone has a diameter which is larger than the diameter of an outlet-end zone of said bore of said perforated disk.

15. The process as in claim 14 wherein said bore of said perforated disk has a transition zone located between said inlet-end zone and said outlet-end zone, and said transition zone has an angle of inclination of from about 55° to about 65° relative to the longitudinal axis of said bore of said perforated disk.

16. The process as in claim 14 wherein said outlet-end zone of said bore of said perforated disk has a diameter of between about 0.5 and about 1.0 mm.

17. The process as in claim 14 wherein the length of said outlet-end zone is between about 1.5 and about 2 times the diameter of said outlet-end zone.

18. The process as in claim 14 wherein the diameter of said inlet-end zone is between about 1.7 and about 3 times the diameter of said outlet-end zone.

19. The process as in claim 11 wherein said baffle plate has an inner surface facing said displacement cone, and said inner surface has a rounded configuration.

20. The process as in claim 19 wherein the distance from said inner surface of said baffle plate facing said displacement cone to said displacement cone is substantially constant.

* * * * *